3,121,117
ORGANOBORON COPOLYMERS AND METHOD
FOR THEIR PREPARATION
Sheldon L. Clark, Orange, Conn., Herbert L. Goldstein, Washington, D.C., and Theodore L. Heying, Palo Alto, Calif., assignors to Olin Mathieson Chemical Corporation
No Drawing. Filed Dec. 14, 1960, Ser. No. 75,875
9 Claims. (Cl. 260—606.5)

This invention relates to novel organoboron copolymers and to a method for their preparation. More in particular, this invention relates to the preparation of vinylcarborane-allylcarborane copolymers which are useful as fuels for solid propellants. In addition, this invention also relates to solid propellant compositions containing said organoboron copolymers and to a method for their preparation.

Compounds of the carborane class can be prepared by the reaction of decaborane or an alkylated decaborane having one to two alkyl groups containing 1 to 5 carbon atoms in each alkyl group with an acetylenic hydrocarbon containing at least one olefinic bond and from four to ten carbon atoms in the presence of a wide variety of ethers, nitriles, amines or sulfides. The preparation of vinylcarborane and allylcarborane is described in application Serial No. 813,032, filed May 13, 1959, of Ager, Heying and Mangold. For example vinylcarborane $$B_{10}H_{10}CHCCH=CH_2$$

can be prepared by reacting vinyl acetylene, decaborane, diethyl sulfide and benzene for about 8 hours at reflux temperature. Allylcarborane, $B_{10}H_{10}CHCCH_2CH=CH_2$, is obtained in the same general manner. Hereinafter in the specification and claims the term vinylcarborane refers to the compound $B_{10}H_{10}CHCCH=CH_2$ and the term allylcarborane refers to the compound $$B_{10}H_{10}CHCCH_2CH=CH_2$$

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets, and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The viscous, semi-solid polymers produced according to the process of this invention can be cured to form solid products.

In accordance with the present invention, it has been discovered that vinylcarborane and allylcarborane can be polymerized in a conventional bulk polymerization process to produce valuable organoboron copolymers. The copolymerization of the two reactants is carried out in the presence of an oxygen-yielding catalyst. In this process, the liquid reactants are charged to the reactor along with the catalyst. The copolymerization is then brought rapidly to a suitable reaction temperature and the system is agitated for a period of from about 2 to about 40 hours. During the polymerization reaction, the free-space in the reactor is continuously purged with nitrogen.

In general, the amount of the oxygen-yielding catalyst employed can be varied widely from about 2 to about 15 percent by weight, based on the total weight of the charge, with the preferred weight of catalyst being from about 5 to about 12 perecnt by weight, based on the total weight of the charge. Suitable catalysts include, for example, benzoyl peroxide, tertiary butyl peroxide, acetyl peroxide, acetyl benzoyl peroxide, cumene hydroperoxide, hydrogen peroxide, sodium persulfate, potassium persulfate, sodium percarbonate, potassium percarbonate, sodium perborate, potassium perborate, tertiary butyl hydroperoxide, lauryl peroxide and acetone peroxide. The molar ratio of vinylcarborane to allylcarborane employed in the polymerization reaction can be from about 1:1 to 5:1. In carrying out the process of this invention the reaction temperature can be varied from about 100° C. to 225° C. with the preferred temperature being from about 115° C. to about 200° C.

The physical properties of the copolymers are considerably effected by changing the reaction conditions. In general, copolymers ranging from solids to viscous semi-solids can be produced by the process of this invention.

Solid vinylcarborane-allylcarborane copolymers can be obtained at a lower temperature, 130° C. as compared with 160–180° C., and in less time, 3 hours as against approximately 24 hours, with the addition of about 5 weight percent of divinyl benzene, based on the total weight of the charge, together with about 5 weight percent of an oxygen-yielding catalyst based on the total weight of the charge.

The process of this invention is illustrated in detail by the following examples. In the examples, the term "moles" signifies gram moles.

EXAMPLE I

To a one-pound, glass, resin kettle, 130.0 grams of vinylcarborane (recrystallized from methanol-water), an equal molar quantity of allylcarborane (146.4 grams) and 15.69 grams of tertiary butyl peroxide (5.5 percent based on the total weight), were added.

The kettle was equipped with a glass, anchor-shaped stirrer and a top-entering adapter connected to a nitrogen source. An outlet line connected the top of the reactor to a bubble-off containing mineral oil. The resin kettle was placed in an oil bath at room temperature and the free-space over the charge was swept with a stream of nitrogen during the entire experiment. The oil bath temperature was raised to 170° C.±5° C. and maintained at that temperature for 18 hours. On cooling to room temperature the material became very viscous. The product was analyzed and found to contain 58.4 (58.3, 58.4) percent boron, 31.9 (31.2, 32.6) percent carbon and 9.0 (8.99, 8.95) percent hydrogen. In addition, it had the following properties:

Molecular weight _____ 3,000.

Viscosity (centipoises) _____ 15,000 at 70° C. ± .05° C.

Density $\left(\frac{20°}{4°} C.\right)$ _____ 0.9276.

EXAMPLE II

In this experiment a 50 ml. Pyrex test tube having a 24/40 standard-taper joint at the top served as the reactor. The male section of this joint was formed into a top closure for the reactor. A nitrogen inlet adapter and a nitrogen outlet connection were also provided in the closure and, in addition, the reactor was equipped with a glass stirrer.

Into this modified test tube, 6.0 grams of vinylcarborane (0.341 mole), 6.31 grams of allylcarborane (0.0341 mole) and 1.0 gram of tertiary butyl peroxide (10 percent by weight), were added. The test tube was placed in an oil bath and heated to 140° C. A nitrogen purge was maintained on the system and the material was stirred during the entire experiment. The reactants were maintained at 140° C. for 16 hours; then the temperature was raised to 180° C. for 4 hours. At this point the heating was terminated and as the temperature dropped to 90° C. the material became viscous. The temperature was raised to 180° C. and maintained for an additional 4 hour period after which the reaction mixture was allowed to cool to room temperature. The product which weighed 6.5 grams was a semi-solid, oily compound at room temperature. A number of analyses were performed on the product and it was shown to contain 59.9 (59.9, 59.9) percent boron, 30.5 (30.6, 30.3) percent carbon and 7.9 (8.3, 7.5) percent hydrogen.

EXAMPLES III–VIII

These examples, which are summarized in Table 1 below, and which were performed in the same general manner as Examples I and II, illustrate various embodiments which fall within the scope of this invention.

extrusion. Thereafter the resin can be cured by resorting to heating at moderate temperatures. For further information concerning the formulations of solid propellant compositions, reference is made to U.S. Patent 2,622,277 to Bonnell and to U.S. Patent 2,646,596 to Thomas.

Propellant compositions can also be prepared using as an oxidizable material a boron-containing fuel such as the $(B_{10}H_{10}CHC-CH=CH_2)/(B_{10}H_{10}CHCCH_2CH=CH_2)$ copolymer of this invention or a conventional fuel together with an oxidizer such as ammonium perchlorate and employing one or more of the products of this invention as a binder or fuel-binder.

The following illustrates the preparation of a solid propellant composition containing the copolymer of this invention. In this case, the vinylcarborane-allylcarborane copolymer is utilized as the solid fuel component.

*Table 1*

| Example | Vinylcarborane $(B_{10}H_{10}CHC-CH=CH_2)$ (Mole) | Allylcarborane $(B_{10}H_{10}CHC-CH_2-CH=CH_2)$ (Mole) | Catalyst [1] (Percent) [2] | Temperature (° C.) | Time (Hours) | Results | Analysis (Percent) |
|---|---|---|---|---|---|---|---|
| I | 0.7388 | 0.7911 | 5.5 | 165–175 | 18 | very viscous polymer [4] | 58.4 boron, 31.9 carbon, 9.0 hydrogen. |
| II | 0.0341 | 0.0341 | 10 | 140 / 180 | 16 / 8 | semi-solid oily compound.[5] | 59.9 boron, 30.5 carbon, 7.9 hydrogen. |
| III | 0.162 | 0.054 | 5 | 160–180 | 24 | viscous polymer | 59.3 boron, 33.1 carbon, 9.2 hydrogen. |
| IV | 0.108 | 0.054 | 6 | 165–180 | 36 | semi-solid | 59.4 boron. |
| V | 0.0293 | 0.034 | 5 | 168–170 | 23 | viscous polymer | 57.1 boron. |
| VI | 0.0293 | 0.034 | [3] 5 | 130 | 3 | solid polymer | |
| VII | 0.41 | 0.41 | 5.8 | 165–175 | 23 | hard solid polymer [6] | 59.9 boron, 31.5 carbon, 8.6 hydrogen. |
| VIII | 0.41 | 0.41 | 14 | 170 | 47 | very viscous polymer [7] | |

[1] Tertiary butyl peroxide.
[2] Based on the total weight of the charge.
[3] In this experiment, 5 weight percent divinyl benzene, based on the total weight of the charge, was also added together with 5 weight percent of tertiary butyl peroxide.
[4] Molecular wt.—3,100, viscosity at 70° C.—15,000 cps., Density—0.928 gm./cc., softening pt.—35° C., M. P. 60–65° C.
[5] M. P. 230–240° C.
[6] Molecular wt.—6,000, softening pt.—90° C., M. P. 127–128° C.
[7] Molecular wt.—2,100–2,500, viscosity at 70° C.—7,600 cps., softening pt.—30° C., M. P. 55° C.

The boron-containing solid materials produced by practicing the methods of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and from 65 to 90 parts by weight of the oxidizer are used. In the propellant, the oxidizer and the product of the present process are formulated in intimate admixture with each other, as by finely subdividing each of the materials and thereafter intimately mixing them. The purpose in doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of the oxidizer and the boron compound. The ingredients can be thoroughly mixed with a simultaneous removal of solvent, and following this the solvent free mixture can be molded into the desired shape as by Ammonium perchlorate, 63 grams, which was stored under vacuum at 98° C. at all times, and 0.06 gram of carbon black were weighed out and placed in an 80 ml. capacity covered Brabender Plastograph (internal mixer) which was maintained at 55° C. These materials were mixed for 30 minutes to bring them to the temperature of the mixer. The mixer was turned on and off by remote control. In the next step, 18.0 grams of the $(B_{10}H_{10}CHC-CH=CH_2)/(B_{10}H_{10}CHCCH_2CH=CH_2)$ copolymer was added to the ammonium perchlorate-carbon black mixture. The cover was put on and the mixer started. After 30 minutes of mixing at 55° C. the heating was terminated and the mixing continued for an additional 3.5 hours. The propellant mix was removed, spread on a piece of aluminum foil and placed in a vacuum chamber, where it was degassed for 30 minutes at ambient temperature. The uncured propellant was then placed in a stainless-steel mold with an aluminum foil-lined cavity which was 2 in. x 5 in. x ⅛ in. With the cover plate of the mold in place, the mold was placed in a Carver ten-ton, laboratory hydraulic press and, by remote control, pressure was applied to the press (2200 p.s.i.) with simultaneous heating. The propellant was cured for 24 hours at 95° C., after which the heat was turned off and the pressure was released. When cool, the mold was removed from the press and the cured slab was removed from the mold. The resulting slab was a tough, rubbery material suitable for use as a solid propellant.

What is claimed is:

1. A method for the production of an organoboron copolymer which comprises copolymerizing allylcarborane with vinylcarborane in the presence of a peroxy catalyst for vinyl-type polymerizations.

2. A method for the production of an organoboron copolymer which comprises copolymerizing allylcarborane with vinylcarborane in a bulk polymerization system and in the presence of a peroxy catalyst for vinyl-type polymerizations.

3. The method of claim 2 wherein the peroxy catalyst is tertiary butyl peroxide.

4. A method for the production of an organboron copolymer which comprises copolymerizing vinylcarborane and allylcarborane together with a minor amount of divinylbenzene in the presence of a peroxy catalyst for vinyl-type polymerizations.

5. A method for the production of an organoboron copolymer which comprises copolymerizing vinylcarborane and allylcarborane together with a minor amount of divinylbenzene in a bulk polymerization system and in the presence of a peroxy catalyst for vinyl-type polymerizations.

6. The method of claim 5 wherein the peroxy catalyst is tertiary butyl peroxide.

7. The product produced by the method of claim 1.

8. The product produced by the method of claim 3.

9. The product produced by the method of claim 6.

No references cited.

UNITED STATES PATENT OFFICE
CERTIFICATE OF CORRECTION

Patent No. 3,121,117                                            February 11, 1964

Sheldon L. Clark et al.

It is hereby certified that error appears in the above numbered patent requiring correction and that the said Letters Patent should read as corrected below.

Column 2, line 2, for "perecnt" read -- percent --; same column 2, line 53, for "3,000" read -- 3,100 --.

Signed and sealed this 18th day of August 1964.

(SEAL)
Attest:

ERNEST W. SWIDER                                    EDWARD J. BRENNER
Attesting Officer                                         Commissioner of Patents